United States Patent
Boyer et al.

(10) Patent No.: US 12,197,329 B2
(45) Date of Patent: Jan. 14, 2025

(54) RANGE-BASED CACHE FLUSHING

(71) Applicant: ADVANCED MICRO DEVICES, INC., Santa Clara, CA (US)

(72) Inventors: Michael W. Boyer, Redmond, WA (US); Preyesh Dalmia, Madison, WI (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 34 days.

(21) Appl. No.: 18/078,298

(22) Filed: Dec. 9, 2022

(65) Prior Publication Data

US 2024/0193083 A1 Jun. 13, 2024

(51) Int. Cl.
*G06F 12/0804* (2016.01)

(52) U.S. Cl.
CPC .. *G06F 12/0804* (2013.01); *G06F 2212/1024* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24;
(Continued)

(56) References Cited

U.S. PATENT DOCUMENTS 4,315,312 A * 2/1982 Schmidt .............. G06F 12/0864
711/172
5,155,824 A * 10/1992 Edenfield ............ G06F 12/0804
711/143
(Continued)

OTHER PUBLICATIONS

Difference between virtual page and page frame ?; user3344003; Feb. 16, 2017; retrieved from https://stackoverflow.com/questions/42258337/difference-between-virtual-page-and-page-frame on Mar. 8, 2024 (Year: 2017).*
(Continued)

*Primary Examiner* — Daniel C. Chappell (57) ABSTRACT

Systems and methods of cache flushing include receiving, from a software application, a first cache flush request to perform a range-based cache flush of a contiguous virtual address range within a virtual memory that maps to a physical memory. A single cache walk is triggered via a second cache flush request to a cache. The single cache walk performs the range-based cache flush for the contiguous physical address range from a beginning address of the contiguous physical address range to an ending address of the contiguous physical address range in response to the first cache flush request.

20 Claims, 5 Drawing Sheets

(58) Field of Classification Search
CPC ........... G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,497,480 | A * | 3/1996 | Hayes | G06F 12/1027 711/E12.033 |
| 5,606,683 | A * | 2/1997 | Riordan | G06F 12/1027 711/6 |
| 5,845,325 | A * | 12/1998 | Loo | G06F 12/1063 711/E12.039 |
| 6,684,305 | B1 * | 1/2004 | Deneau | G06F 12/08 711/155 |
| 6,941,442 | B2 * | 9/2005 | Devereux | G06F 12/1027 711/E12.075 |
| 7,895,410 | B1 * | 2/2011 | Wu | G06F 12/1009 711/208 |
| 9,110,594 | B2 * | 8/2015 | Keeler | G06F 16/22 |
| 9,436,603 | B1 * | 9/2016 | Pohlack | G06F 12/0808 |
| 10,042,762 | B2 * | 8/2018 | Jayasena | G06F 12/0811 |
| 10,049,044 | B2 * | 8/2018 | Boyer | G06F 12/084 |
| 10,706,147 | B1 * | 7/2020 | Pohlack | H04L 63/1416 |
| 10,929,288 | B1 * | 2/2021 | Moore | G06F 12/0804 |
| 11,500,583 | B2 * | 11/2022 | Cho | G06F 12/0246 |
| 11,734,175 | B2 * | 8/2023 | Jin | G06F 11/1446 711/162 |
| 11,762,769 | B2 * | 9/2023 | Jin | G06F 12/0804 711/171 |
| 2003/0009643 | A1 * | 1/2003 | Arimilli | G06F 12/0831 711/119 |
| 2003/0028819 | A1 * | 2/2003 | Chiu | G06F 11/2089 714/5.11 |
| 2003/0210248 | A1 * | 11/2003 | Wyatt | G06F 12/0888 345/557 |
| 2004/0103272 | A1 * | 5/2004 | Zimmer | G06F 9/4403 713/1 |
| 2006/0021032 | A1 * | 1/2006 | Challener | G06F 21/80 726/22 |
| 2006/0136656 | A1 * | 6/2006 | Conley | G06F 12/0893 711/E12.04 |
| 2008/0109625 | A1 * | 5/2008 | Erlingsson | G06F 12/1441 711/E12.001 |
| 2009/0006803 | A1 * | 1/2009 | Luick | G06F 12/1045 711/E12.001 |
| 2010/0011168 | A1 * | 1/2010 | Ryu | G06F 12/0804 711/135 |
| 2010/0138608 | A1 * | 6/2010 | Rappoport | G06F 12/0806 711/123 |
| 2010/0138610 | A1 * | 6/2010 | Rappoport | G06F 12/0875 711/E12.001 |
| 2010/0138611 | A1 * | 6/2010 | Rappoport | G06F 12/0864 711/E12.001 |
| 2010/0174869 | A1 * | 7/2010 | Gorobets | G06F 12/1027 711/170 |
| 2010/0235670 | A1 * | 9/2010 | Keller | G06F 1/3237 713/324 |
| 2011/0314224 | A1 * | 12/2011 | Piry | G06F 9/52 711/E12.017 |
| 2012/0137079 | A1 * | 5/2012 | Ueda | G06F 12/1036 711/141 |
| 2012/0331234 | A1 * | 12/2012 | Hirao | G06F 12/0806 711/143 |
| 2014/0258637 | A1 * | 9/2014 | Hong | G06F 12/0808 711/135 |
| 2015/0016172 | A1 * | 1/2015 | Loh | G06F 3/0608 365/51 |
| 2016/0299712 | A1 * | 10/2016 | Kishan | G06F 3/0631 |
| 2017/0010965 | A1 * | 1/2017 | Hsu | G06F 12/0806 |
| 2017/0123996 | A1 * | 5/2017 | Kishan | G06F 12/1009 |
| 2017/0357583 | A1 * | 12/2017 | Boyer | G06F 12/084 |
| 2018/0074958 | A1 * | 3/2018 | Jayasena | G06F 12/0811 |
| 2018/0143903 | A1 * | 5/2018 | Wu | G06F 12/121 |
| 2018/0247082 | A1 * | 8/2018 | Durham | G06F 21/53 |
| 2019/0138458 | A1 * | 5/2019 | Engh-Halstvedt | G06F 12/1045 |
| 2019/0294551 | A1 * | 9/2019 | Abhishek Raja | G06F 12/1027 |
| 2019/0384714 | A1 * | 12/2019 | Kaleeluddin | G06F 12/0891 |
| 2020/0057664 | A1 * | 2/2020 | Durham | G06F 21/53 |
| 2020/0159558 | A1 * | 5/2020 | Bak | G06F 12/08 |
| 2020/0167291 | A1 * | 5/2020 | Asaro | G06F 12/1009 |
| 2020/0218471 | A1 * | 7/2020 | Chen | G06F 3/0659 |
| 2020/0218665 | A1 * | 7/2020 | Swaine | G06F 12/1009 |
| 2020/0272557 | A1 * | 8/2020 | Campbell | G06F 11/3636 |
| 2021/0311884 | A1 * | 10/2021 | Grocutt | G06F 12/1416 |
| 2021/0311997 | A1 * | 10/2021 | Grocutt | G06F 16/90348 |
| 2022/0019698 | A1 * | 1/2022 | Durham | G06F 21/71 |
| 2022/0214973 | A1 * | 7/2022 | Richardson | G06F 12/0808 |
| 2024/0143510 | A1 * | 5/2024 | Smekalov | G06F 12/0864 |
| 2024/0193083 | A1 * | 6/2024 | Boyer | G06F 12/084 |

OTHER PUBLICATIONS

TLB flush multiple pages with a single IPI; Mel Gorman; Apr. 15, 2015; retrieved from https://yhbt.net/lore/all/552ED8FF.8000109@intel.com/T/v on Mar. 8, 2024 (Year: 2015).*

Virtual Memory; Pearson; Sep. 29, 2022; retrieved from https://web.archive.org/web/20220929182028/https://www.pearsonhighered.com/assets/samplechapter/0/1/3/0/0130610143.pdf on Mar. 6, 2024 (Year: 2022).*

Page frame number vs. Page table entry; cadaniluk; Nov. 13, 2015; retrieved from https://stackoverflow.com/questions/33686331/page-frame-number-vs-page-table-entry on Mar. 8, 2024 (Year: 2015).*

N. Zhang, H. Sun, K. Sun, W. Lou and Y. T. Hou, "CacheKit: Evading Memory Introspection Using Cache Incoherence," 2016 IEEE European Symposium on Security and Privacy (EuroS&P), Saarbruecken, Germany, 2016, pp. 337-352, doi: 10.1109/EuroSP.2016.34. (Year: 2016).*

X. Wang, P. Jin, Y. Luo and Z. Chu, "Range Cache: An Efficient Cache Component for Accelerating Range Queries on LSM—Based Key-Value Stores," 2024 IEEE 40th International Conference on Data Engineering (ICDE), Utrecht, Netherlands, 2024, pp. 488-500, doi: 10.1109/ICDE60146.2024.00044. (Year: 2024).*

A. Gupta and W. . . —D. Weber, "Cache invalidation patterns in shared-memory multiprocessors," in IEEE Transactions on Computers, vol. 41, No. 7, pp. 794-810, Jul. 1992, doi: 10.1109/12.256449. (Year: 1992).*

* cited by examiner

RANGE-BASED CACHE FLUSHING

BACKGROUND

To support execution of instructions, processing systems typically implement one or more compute complexes, each compute complex having one or more processor cores and a memory hierarchy having memory modules to store instructions and data to be accessed by the executing instructions. Each processor core is associated with a main memory at the top of the hierarchy that stores a larger quantity of data that can be accessed by the executing instructions at the corresponding processor core and one or more local levels of caches at lower levels of the memory hierarchy that store subsets of the data stored at the main memory.

Many processing systems use virtual memory for handling data accesses by executing programs (e.g., applications, operating systems, device drivers, etc.). In such a processing system, programs access memory using "virtual addresses" in "virtual address spaces," which are local address spaces that are specific to corresponding programs, instead of accessing memory using addresses based on the physical locations (or "physical addresses") of blocks of memory (or "pages"). Thus, to support memory accesses, the processing system typically employs address translation circuitry to translate the virtual addresses to corresponding physical addresses.

Processor cores in the processing system keep track of the physical locations of the pages for the programs so that programs are not required to keep track of the physical locations of pages in memory. As part of managing the physical locations of pages, the processor cores translate the virtual addresses used by the programs in memory access requests into the physical addresses where the data is actually located. The processor cores then use the physical addresses to perform the memory accesses for the programs.

In order to enable the virtual address to physical address translation, the computing device includes a page table, which is a record stored in a memory of the computing device that includes an entry, or a "page table entry," with virtual address to physical address translation information for pages of data that are stored in the main memory. Upon receiving a request from a program to access memory at a given virtual address, a processor acquires corresponding physical address information from the page table by performing a page table walk, during which the page table is searched, possibly entry-by-entry, for a page table entry that provides the physical address associated with the virtual address.

When an application program modifies data that has been allocated to a cache, the processor core typically keeps the copy in its cache in modified ("dirty") form until the cache needs to make room for other data and writes back the updated copy to memory. To maintain coherency, the application program or operating system may periodically or in response to an event "flush" (i.e., write back) any dirty data from the cache to persistent memory, thereby allowing updates to critical data to be preserved and globally observable.

Graphic processing units (GPUs) have traditionally implemented relaxed consistency models and relied on bulk cache invalidation and dirty data writebacks at points of synchronization to keep caches coherent. These cache flushes can reduce the performance of subsequent kernels by substantially increasing the cache miss rate. To mitigate this, recent GPU designs have introduced range-based flushing to avoid discarding useful data. However, range-based flushing is quite slow for all but the smallest ranges, because it requires address translation for every page in the address range.

As shared cache capacity grows with increasing GPU sizes, performance overhead of flushing shared caches at synchronization points and kernel boundaries also grows. With multi-GPU and GPU-Processing in Memory (PIM) design forms gaining use, the cost of flushing GPU caches increases in importance. Range-based flushing reduces the overhead of flushing in one dimension (the impact on cache hit rates for subsequent kernels) but increases the overhead in another dimension (the latency of the flush itself).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

To keep caches coherent, GPUs perform costly cache writeback and invalidation operations (collectively called a "cache flush" or "flush") at synchronization points and kernel boundaries. These cache flushes have become more expensive as GPU designs have incorporated ever larger caches. This trend is accelerating with increased shared graphics cache capacity.

Cache operations required to implement a cache flush depend on a scope of the cache flush. For example, a Graphics Level 2 (GL2) cache can be shared by all threads on a device. A GL2 cache flush thus requires a system-scope flush that invalidates data stored at both the GL2 and Graphics Level 1 (GL1) caches as well as a writeback of the data stored at the GL2 cache to memory. By contrast, a device-scope flush only requires invalidation of a GL1 cache. A writeback from a GL1 cache is not needed because the GL1 cache is write-through and cannot contain dirty data. A system-scope flush is thus significantly more expensive than a device-scope flush.

FIGS. 1-5 illustrate techniques for mitigating drawbacks associated with typical range-based flushing, while maintaining all of its benefits. The latency of a range-based cache flush is determined by either the address translation latency or cache walk latency (i.e., latency related to traversing the cache to flush data therein). The optimizations disclosed herein target one or both of these bottlenecks. Addressing whichever of these bottlenecks is on a critical path will improve flush latency, up until a point that the other bottleneck starts to limit performance. The optimizations disclosed herein are also orthogonal and can be applied together for an even greater impact. The device and method can impact performance for nearly all memory-sensitive applications, such as GPU-enabled software applications, optimizing range-based cache flushing.

To address typical problems with range-based flushing and to enable improved range-based cache flushing, FIGS. 1-5 describe systems and methods for reducing the number of cache walks. In various embodiments, systems and methods of cache flushing include receiving, from a software application, a first cache flush request to perform a range-based cache flush of a contiguous virtual address range within a virtual memory that is mapped to a contiguous physical address range within a physical memory. A single cache walk is triggered, via a second cache flush request to a cache. The single cache walk performs the range-based cache flush for the contiguous physical address range from a beginning address of the contiguous physical address range to an ending address of the contiguous physical address range in response to the first cache flush request. Thus, to facilitate reducing the number of address translations and/or cache walks, the systems and method disclosed herein trigger a single cache walk for a contiguous physical address range.

In some embodiments, techniques for reducing the number of cache walks further include translating, in response to the first cache flush request, a first beginning virtual address of a first virtual page within the virtual memory into a first beginning physical address of a first physical address range of a first physical page within the physical memory. A current region is set to the first physical address range. A second beginning virtual address of a second virtual page within the virtual memory is translated into a second beginning physical address of a second physical address range of a second physical page within the physical memory. The current region is set to the first physical address range plus the second physical address range in response to the first physical address range being contiguous with the second physical address range. The single cache walk is sent for a current range corresponding to the contiguous physical address range from a beginning address of the contiguous physical address range to an ending address of the contiguous physical address range in response to the first physical address range being non-contiguous with the second physical address range.

In some embodiments, techniques for reducing the number of cache walks further include translating a beginning address of the contiguous virtual address range into the beginning address of the contiguous physical address range and translating an ending address of the contiguous virtual address range into the ending address of the contiguous physical address range in response to the contiguous virtual address range mapping to the contiguous physical address range. A single cache flush is triggered in response to the contiguous virtual address range mapping to the contiguous physical address range.

In some embodiments, techniques for reducing the number of cache walks further include sending a pair of translation requests for a beginning virtual address and an ending virtual address of the virtual address range, and receiving, in response to the first translation request, a beginning physical address and an ending physical address within the physical memory. A single cache flush request is sent to flush a plurality of physical pages between the beginning physical address and the ending physical address in response to a first size of the virtual address range equaling a second size calculated from the beginning physical address and the ending physical address. A set of translation requests for remaining ones of the plurality of virtual pages between the beginning virtual address of the contiguous virtual address range and the ending virtual address of the contiguous virtual address range, the remaining ones of the plurality of virtual pages not included with the pair of translation requests, is sent while flushing the plurality of physical pages between the beginning physical address and the ending physical address. The plurality of physical pages between the beginning physical address and the ending physical address are verified to be contiguous based on responses to the set of translation requests.

Figure 1:
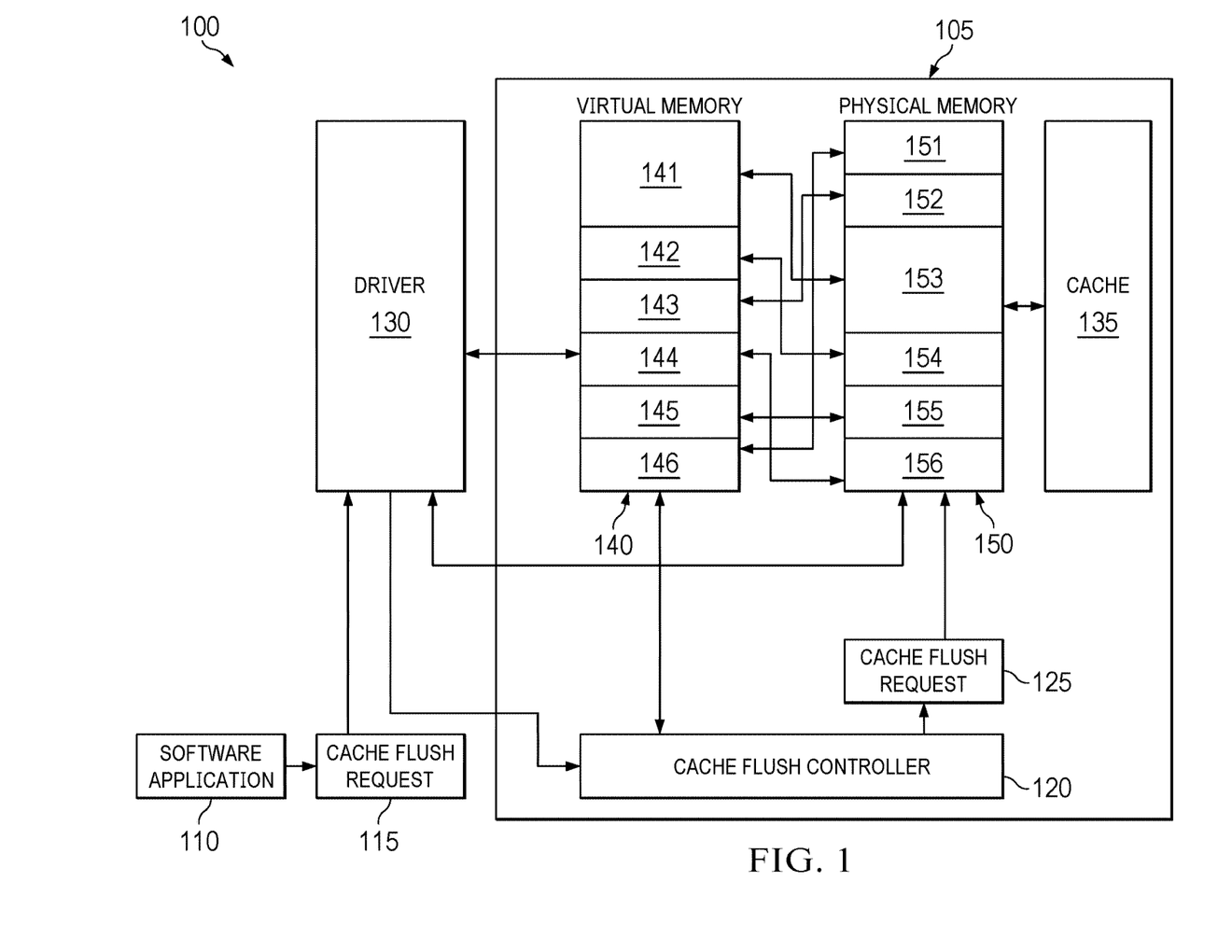
FIG. 1 illustrates a processing system in which at least one of a cache flush controller and a driver are used to optimize cache walks to flush a contiguous physical address range, in accordance with some embodiments.

FIG. 1 illustrates an example system 100 in which at least one of a cache flush controller and a runtime software, such as a driver that acts as an interface between hardware and application software, are used to optimize cache walks to flush a contiguous physical address range, in accordance with some embodiments. The system 100 includes a software application 110, a driver 130, and a device 105, the device 105 including a cache flush controller 120, a virtual memory 140, and a physical memory 150. The virtual memory 140 maps to the physical memory 150. In some embodiments, the device 105 is a GPU and the virtual and physical memories 140, 150 are graphics processing unit virtual and physical memories, while in some other embodiments the device 105 is a non-graphics processing unit that utilizes both the virtual memory 140 and the physical memory 150. In embodiments where the device is a GPU, the cache flush controller 120 is a graphics cache flush controller.

Typical cache flush controllers perform an address translation for each page within a virtual memory, translating a base or beginning virtual address for each page into a base or beginning physical address. Typically, virtual memory is memory allocated to an application, and a cache flush may only target a specific subset of that virtual memory. Depending upon the number of pages within the virtual memory, the number of address translations can become extremely large, particularly as the virtual memory 140 increases in size to accommodate more pages. Such large numbers of address translations can negatively impact system performance. To facilitate reducing the number of address translations and/or cache walks as compared to the typical use of a cache walk to flush each page within physical memory, a single cache walk is triggered for a contiguous physical address range within the physical memory 150. The cache flush controller 120 and/or the driver 130 determines if the contiguous virtual address range within the virtual memory 140 maps to a contiguous physical address range within the physical memory 150 and triggers a single cache walk for a contiguous physical address range within the physical memory 150.

A software application 110 (e.g., HPC, ML, graphics, etc.) sends a cache flush request 115 to the driver 130 which in turn triggers the cache flush controller 120 to flush at least one virtual page stored by the virtual memory 140. In some embodiments, the cache flush request 115 is a range-based cache flush request to flush pages within the virtual memory 140 (e.g., 4 KB, 512 KB, 2 MB, 4 MB, etc.) within a specified range of memory locations requested to be flushed. The cache flush controller 120 receives the cache flush request 115 from the software application 110 and processes the cache flush request 115. The cache flush controller 120 receives virtual addresses from the software application 110, and in some embodiments a contiguous virtual address range, as specified by the cache flush request 115.

The cache flush controller 120 further performs an address translation for beginning addresses of the virtual pages 141-146 within the virtual memory 140 specified by the cache flush request 115. Thus, the cache flush controller 120 generates a beginning physical address in response to the cache flush request 115, that is a beginning address of a physical address range. Based on a set page size (e.g., 4 KB, 512 KB, 2 MB, 4 MB, etc.), the translation results in a determination of a physical address range for a physical page that corresponds to a virtual page. The cache flush controller 120 triggers a cache flush of any of the physical pages 151-156 within the physical memory 150, and in accordance with embodiments disclosed herein a cache flush of contiguous physical pages. In some embodiments, the cache flush controller 120 triggers a cache walk subsequent to a determination if a contiguous virtual address range is determined to map to a contiguous physical address range. In yet other embodiments, the cache flush controller 120 triggers a cache walk prior to a determination if the virtual address range is determined to map to the physical address range. Irrespective of when the contiguous physical address range is flushed (i.e., before or after a determination is made if the virtual address range is determined to map to the physical address range), the cache walk is based on an address translation, that is, translating a beginning address of a virtual page into a beginning address of a physical address range of at least one physical page.

The "cache walk" is performed, that is, writing back or invalidating any matching lines stored within a cache 135, coupled to the physical memory 150, from a page stored within the physical memory 150 as specified by the physical addresses received from the cache flush controller 120. Thus, the cache walk flushes pages (e.g., matching lines of pages stored within the physical memory 150) from the cache 135. In some embodiments, the matching lines are written back to a higher order memory, such as from an L1 memory to an L2 memory. In the example shown, the virtual memory 140 includes virtual pages 141-146, and contiguous virtual pages 143, 144, and the physical memory 150 includes physical pages 151-156. As shown, the virtual page 141 maps to physical page 153, the virtual page 142 maps to physical page 154, the virtual page 143 maps to physical page 152, virtual page 144 maps to physical page 157, the virtual page 145 maps to physical page 155, and the virtual page 146 maps to physical page 156.

Some contiguous virtual address ranges map to contiguous physical address ranges, and other virtual address ranges do not map to contiguous physical address ranges. For example, contiguous virtual pages 141, 142 map to contiguous physical pages 153, 154, with the other virtual address ranges not mapping to contiguous physical address ranges.

Figure 2:
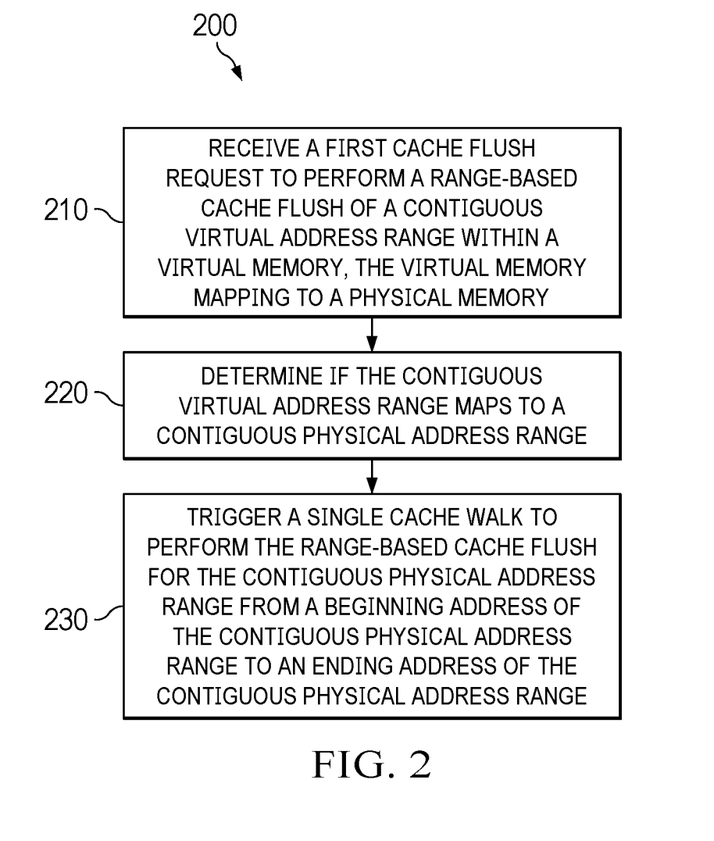
FIG. 2 illustrates an example method to optimize cache flushes for a contiguous physical address range via use of a single cache walk for a contiguous physical address range, in accordance with some embodiments.

FIG. 2 illustrates an example method 200 to optimize cache flushes for a contiguous physical address range via use of a single cache walk for a contiguous physical address range, in accordance with some embodiments. Method 200 begins at block 210. At block 210 the cache flush request 115 is received from the software application 110. The cache flush request 115 requests a range-based cache flush of a contiguous virtual address range within the virtual memory 140. The virtual memory 140 maps to the physical memory 150.

At block 220, a determination is made if the contiguous virtual address range maps to a contiguous physical address range within the physical memory 150. At block 230, a single cache walk is triggered. The single cache walk is triggered via a second cache flush request, the cache flush request 125, that is sent to the physical memory 150. The single cache walk performs the range-based cache flush for the contiguous physical address range from a beginning address of the contiguous physical address range within the physical memory 150 to an ending address of the contiguous physical address range within the physical memory 150. As will be discussed below with respect to FIGS. 3-5, the determination of block 220 can be performed either before or after the single cache walk is triggered. To facilitate a reduced number of cache walks for a range-based cache flush, the method 200 via the cache flush controller 120 performs a single cache walk for the range-based cache flush for the contiguous physical address range if the physical address range is contiguous, thereby reducing the overhead associated with a typical cache walk for a range-based cache flush.

Figure 3:
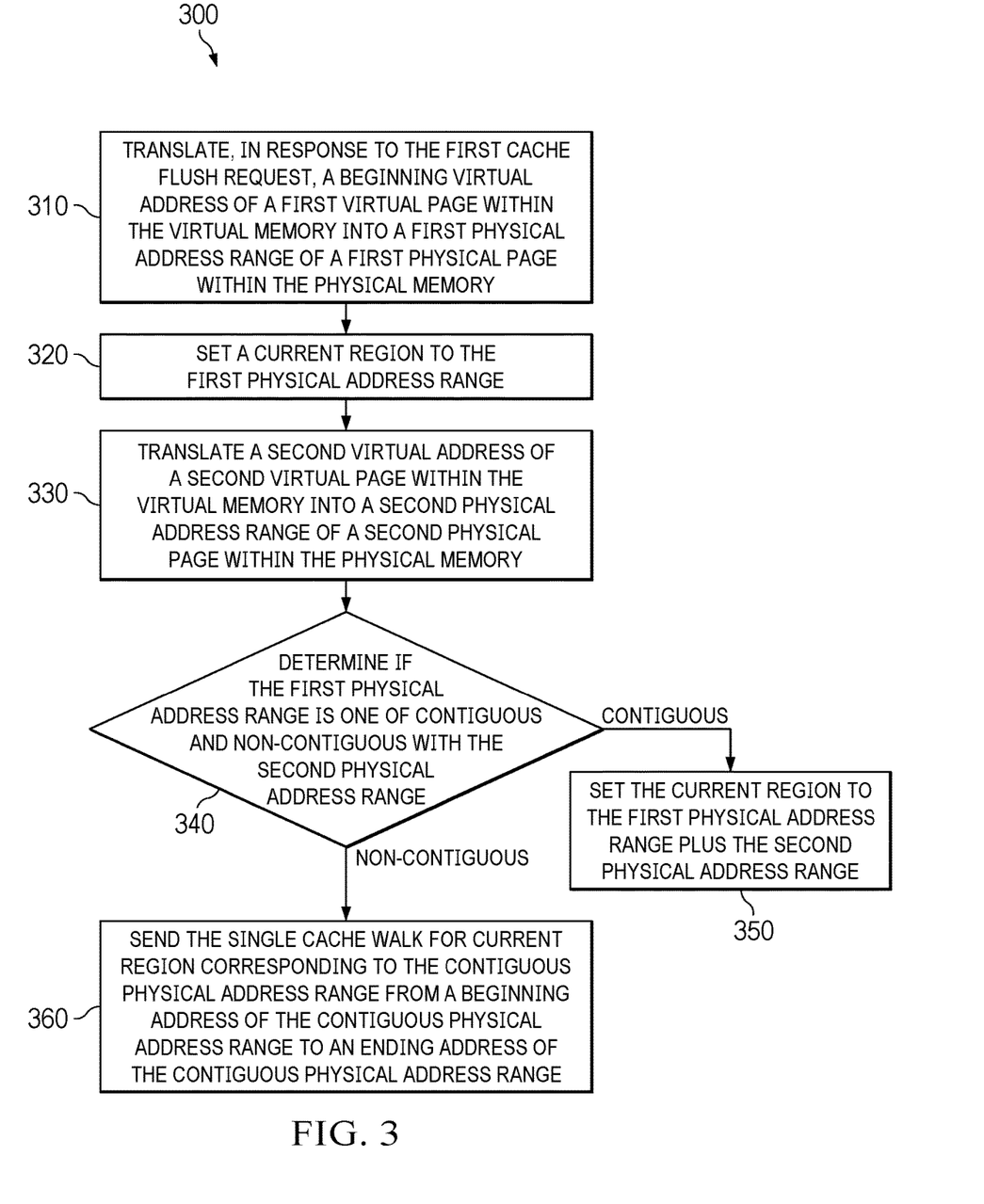
FIG. 3 illustrates an example method for coalescing contiguous pages within a contiguous physical address range for which a single cache walk is triggered, in accordance with some embodiments.

FIG. 3 illustrates an example method 300 for coalescing contiguous pages within a contiguous physical address range for which a single cache walk is triggered, in accordance with some embodiments. In some embodiments, this contiguous physical address range can be the contiguous address range referenced in block 220 above.

When triggering a flush, the software application 110 specifies contiguous pages. Because a corresponding set of physical pages is not guaranteed to be contiguous in a physical address space of the physical memory 150, a conventional cache flush controller triggers a separate cache walk for each physical page. In practice, however, it is common for contiguous virtual pages within a contiguous virtual address range within the address space of the virtual memory 140 to also be contiguous in the physical address space of the physical memory 150. In such cases, it is more efficient to trigger only a single cache walk for a larger physical contiguous region, (i.e., a contiguous physical address range within the physical memory 150), rather than a separate cache walk per page.

To achieve this, in some embodiments the cache flush controller 120 detects contiguous pages from which a contiguous physical address range can be determined. The cache flush controller 120 tracks a single physical address region, referenced as the "current region". When a first page translation returns, the current region is set to the first page's physical address range. When any subsequent page translation returns, there are two possibilities. If the current region and the new translation are physically contiguous, the current region is expanded to include the new translation, thereby coalescing pages within the expanded region. If the current region and the new translation are not physically contiguous, the cache flush request 125 for the current region is sent and then the current region is set to the new translation. This process continues until the complete virtual address range within the virtual memory 140 has been covered. For systems in which a cache walk is a flush bottleneck, this optimization improves performance in the common case.

To implement this method, the cache flush controller 120 determines a contiguous physical address range, that is the "current region" from which a single cache walk for a larger physical contiguous region is triggered. Method 300 starts at block 310, where a beginning virtual address of a first virtual page within the virtual memory 140 is translated into a first physical address within the physical memory 150. For example, the beginning virtual address can be for virtual page 141 from FIG. 1. The beginning address for virtual page 141 can translate into a beginning physical address for physical page 153, shown in FIG. 1.

At block 320 a current region is set to the first physical address range from block 310. In this example, the current region is set to the physical page 153. At block 330, a second beginning virtual address of a second virtual page within the virtual memory 140 is translated into a second beginning physical address of a second physical address range within the physical memory 150. For example, the second beginning virtual address can be for virtual page 142 that is translated into a second beginning physical address of a physical address range for page 154, shown in FIG. 1.

At block 340 a determination is made by the cache flush controller 120 if the first physical address range is one of contiguous and non-contiguous with the second physical address range. With the examples for blocks 310, 320 above, the first physical address range is contiguous with the second physical address range, such that the physical pages 153, 154 are contiguous. If a result of block 340 determines that the first physical address range is contiguous with the second physical address range, the method flow continues to block 350. Alternatively, if at block 340 the cache flush controller 120 determines that the first physical address range is not contiguous with the second physical address range, the method flow continues to block 360.

At block 350, the current region is set to the first physical address range plus the second physical address range. In this example, the current region is set to the address ranges spanning both the physical pages 153, 154. Thereafter, the method 300 is repeated again and again for the next physical address ranges to determine if the next physical address ranges are contiguous with the current range. The current range continues to grow as long as any next physical address ranges are determined to be contiguous. At block 360, the single cache walk from block 230 is sent for the current region corresponding to the contiguous physical address range from the beginning address of the contiguous physical address range to an ending address of the contiguous physical address range. Blocks 330-360 are repeated to determine contiguous physical pages, until all of the available pages are exhausted.

Figure 4:
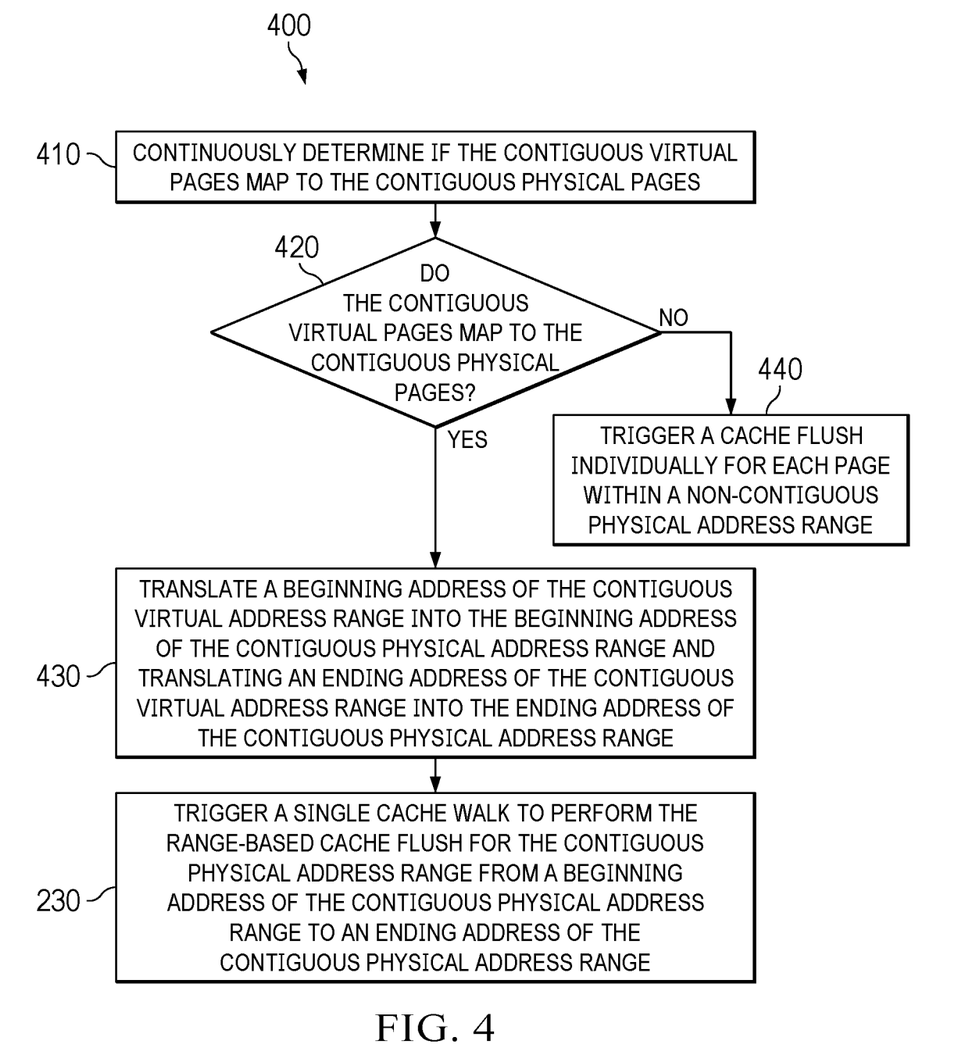
FIG. 4 illustrates an example method that guarantees a physical contiguous address range by continuously determining whether or not each virtual memory allocation maps to a physical contiguous region, in accordance with some embodiments.

FIG. 4 illustrates an example method 400 that guarantees a physical contiguous address range by continuously determining whether or not each virtual memory allocation maps to a physical contiguous region, in accordance with some embodiments. In some embodiments, this physical contiguous region can be the physical contiguous address range referenced in block 220 discussed above.

In systems where address translation is a flush bottleneck, coalescing contiguous pages with method 300 would not provide a benefit. Method 400 reduces address translation overhead by leveraging the fact that large memory allocations frequently are physically contiguous.

In some embodiments, the driver 130 can be configured to continuously determine or track, such as at a time of allocation, whether or not each memory allocation within the virtual memory 140 maps to a contiguous physical region within the physical memory 150. By continuously determining whether or not each memory allocation within the virtual memory 140 maps to a contiguous physical region within the physical memory 150, the driver 130 thereby tracks whether or not a physical contiguous range exists. Then, when the software application 110 triggers a flush of a virtual address range, the driver 130 checks whether the corresponding memory allocation is physically contiguous. If so, the driver 130 translates the virtual address range to a physical address range and triggers a flush based on the physical address range. A result of this is that only two address translations and a single cache walk are needed for a contiguous physical address range, regardless of the size of the contiguous physical address range being flushed. If the allocation is not physically contiguous, the driver 130 triggers a conventional flush using the virtual address range in which the pages within the physical address range are flushed individually page-by-page.

The method 400 begins at block 410, where the cache flush controller 120 makes a continuous determination as to if the contiguous virtual address range maps to the contiguous physical address range. The contiguous virtual address range and the contiguous physical address range can be the same as the contiguous virtual address range and the contiguous physical address range from block 220 discussed above. Block 410 can, such as at a time of allocation, determine, in some embodiments continuously determine that contiguous virtual pages 141, 142 map to contiguous physical pages 153, 154. Likewise, block 410 can determine that virtual pages 143-146 do not map to contiguous physical pages in that the physical pages 152, 156, 155, 151, respectively, are not contiguous physical address ranges.

At block 420 a determination is made as to whether the contiguous virtual pages map to the contiguous physical pages or non-contiguous physical pages. If the contiguous virtual pages are determined to map to the contiguous physical pages, the method flow continues to block 430. For example, the driver 130 determines that the contiguous virtual pages 141, 142 map to contiguous physical pages 153, 154, which they do, the method flow continues to block 430. If the contiguous virtual pages are determined to not map to the contiguous physical pages, i.e., map to non-contiguous physical pages, the method flow continues to block 440. For example, if the driver 130 determines that the virtual pages 143-145 do not map to contiguous physical pages, as the virtual pages 143-145 map to non-contiguous physical pages 152, 156, 155, 151, the method flow continues to block 440.

At block 430 the driver 130 translates a beginning address of the contiguous virtual address range into the beginning address of the contiguous physical address range and an ending address of the contiguous virtual address range is translated into the ending address of the contiguous physical address range. For example, the driver 130 translates the beginning address for physical page 153 and translates the ending address of the physical page 154 (together forming the contiguous physical address range). At Block 230, the driver 130 can then trigger a single cache walk for the contiguous physical address range translated by the driver 130 at block 430, in this example contiguous physical pages 153, 154.

At block 440, a conventional cache flush is triggered individually for each page within a non-contiguous physical address range. For example, a conventional cache walk is triggered for the non-contiguous physical pages 152, 156, 155, 151.

Figure 5:
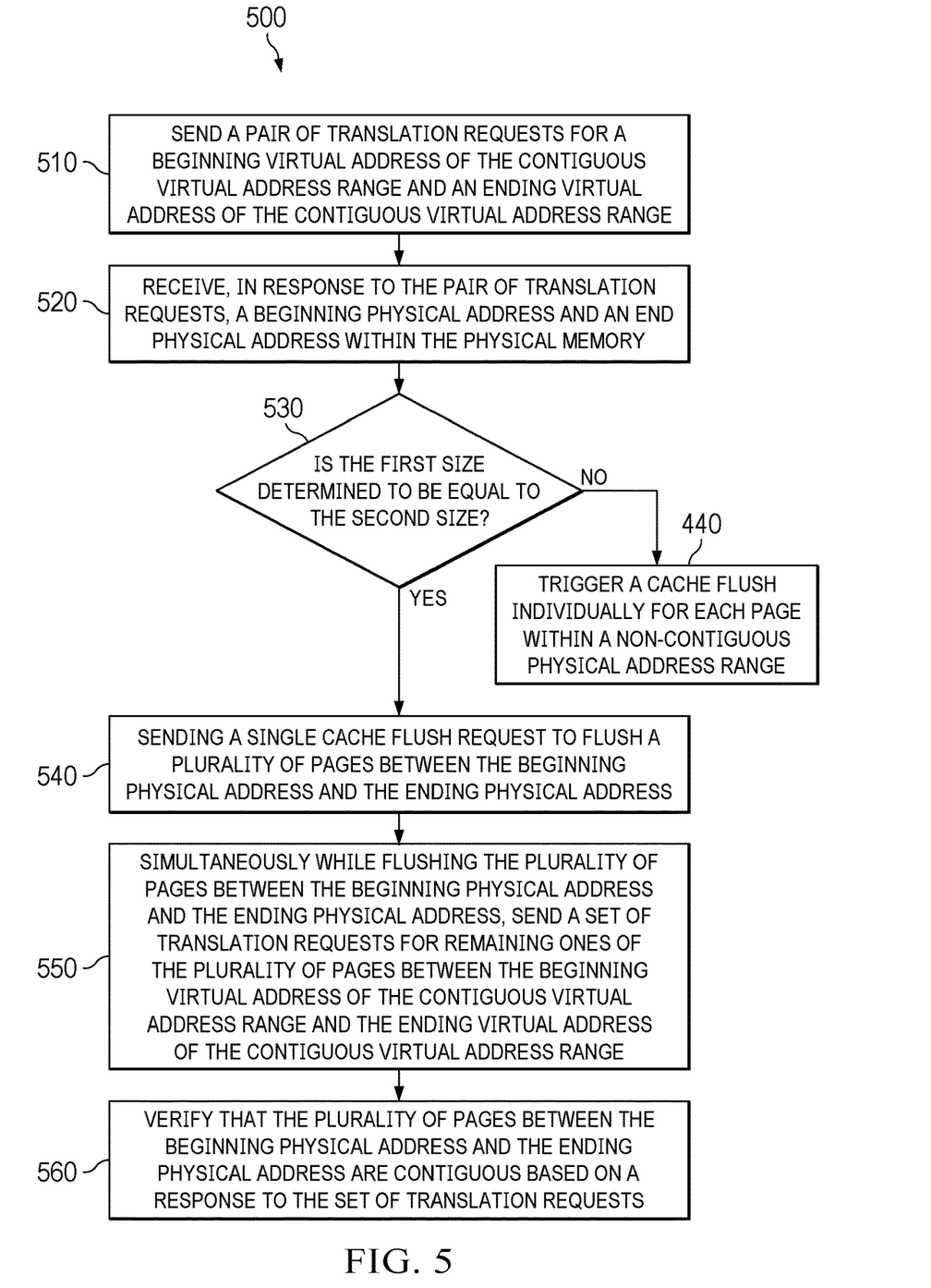
FIG. 5 illustrates an example method that assumes a contiguous physical range for triggering a single cache walk, in accordance with some embodiments.

FIG. 5 illustrates an example method 500 that assumes a contiguous physical range for triggering a single cache walk, in accordance with some embodiments. In some embodiments, this contiguous physical address range can be the contiguous address range referenced in block 220 discussed above.

In some embodiments the cache flush controller 120 assumes that a virtual address range maps to a physically contiguous address range. Instead of walking through the virtual address range at a page granularity, as is done typically, the cache flush controller 120 begins by sending a translation request for the beginning and ending virtual addresses in a virtual address range. When those translations return to the cache flush controller 120, the cache flush controller 120 first checks if the sizes of the virtual address range and the physical address range are equal. If the address ranges are not the same size, then the range cannot be physically contiguous and the cache flush controller 120 falls back to a typical cache walk, a cache walk at a page granularity. If the virtual address ranges are the same size, the virtual address range may map to a physical contiguous address range and cache flush controller 120 sends a single cache flush request for the physical range. While the cache 135 is performing the flush, the cache flush controller 120 verifies that its assumption of physical contiguity is correct. It does this by sending the same sequence of address translations as it would normally and confirming that each page translation has the expected physical address. If any page translation fails this check, the flush request falls back on its original typical behavior. Note that this may flush cache lines unnecessarily, which is inefficient but does not impact correctness.

At block 510, the cache flush controller 120 sends a pair of translation requests for a beginning virtual address of the contiguous virtual address range within the virtual memory 140 and an ending virtual address of the contiguous virtual address range within the virtual memory 140. The contiguous virtual address range is the contiguous virtual address range of block 210. For example, this contiguous virtual address range can include a range spanning contiguous virtual pages 141, 142.

At block 520, the cache flush controller 120 receives a beginning physical address within the physical memory 150 and an ending physical address within the physical memory 150 in response to the pair of translation requests of block 510 for the beginning virtual address of the contiguous virtual address range within the virtual memory 140 and the ending virtual address of the contiguous virtual address range within the virtual memory 140. For example, this contiguous physical address range can include contiguous physical pages 153, 154.

At block 530, the cache flush controller 120 determines if a first size of the contiguous virtual address range of the virtual memory 140 is equal to a second size calculated from the beginning physical address within the physical memory 150 and the ending physical address within the physical memory 150. In this example, the first size for contiguous virtual pages 141, 142 is equal to the second size for the contiguous physical pages 153, 154. If the first size is determined to be equal to the second size, the method flow continues to block 540. If the first size is determined to not be equal to the second size, the method flow continues to block 440 in FIG. 4. Again, with block 440 a conventional cache flush is triggered individually for each page within a non-contiguous physical address range. For example, a conventional cache walk is triggered for the non-contiguous physical pages 152, 157, 155, 151.

At block 540, the cache flush controller 120 sends a single cache flush request to flush a plurality of physical pages between the beginning physical address within the physical memory 150 and the ending physical address within the physical memory 150, such as the contiguous physical pages 153, 154.

At block 550, the cache flush controller 120 sends a set of translation requests for remaining ones of the plurality of virtual pages between the beginning virtual address of the contiguous virtual address range within the virtual memory 140 and the ending virtual address of the contiguous virtual address range within the virtual memory 140. These remaining ones of the plurality of virtual pages are not included with the pair of translation requests of block 510. This set of translation requests is sent simultaneously while flushing the plurality of physical pages between the beginning physical address and the ending physical address.

At block 560, the cache flush controller 120 performs a contiguousness verification for the plurality of physical pages. Block 560 verifies that the plurality of physical pages between the beginning physical address and the ending physical address are contiguous based on a response to the set of translation requests of block 550.

In some embodiments, the apparatus and techniques described above are implemented in a system including one or more integrated circuit (IC) devices (also referred to as integrated circuit packages or microchips), such as the system 100 and methods 200-500 described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded In an Illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising: in response to receiving a first cache flush request to perform a cache flush of a first virtual address range within a virtual memory mapping to a physical memory, setting a current region to a first physical address range of the physical memory that is mapped to the first virtual address range; in response to receiving a second cache flush request to perform a cache flush of a second virtual address range, setting the current region to the first physical address range plus a second physical address range mapped to the second virtual address range in response to the first physical address range being contiguous with the second physical address range; and performing a single cache walk to write back to the physical memory or invalidate matching lines stored within a cache to perform a cache flush of the first virtual address range and the second virtual address range to the current region of the physical memory.

2. The method of claim 1, wherein the first virtual address range is contiguous with the second virtual address range.

3. The method of claim 1, further comprising:
translating, in response to the first cache flush request, a first beginning virtual address of the first virtual address range into a first beginning physical address of the first physical address range within the physical memory;
translating, in response to a third cache flush request to perform a cache flush of a third virtual address range, a third beginning virtual address of the third virtual address range into a third beginning physical address of a third physical address range; and
setting the current region to the first physical address range plus the second physical address range plus the third physical address range in response to the third physical address range being contiguous with the current region.

4. The method of claim 1, further comprising:
in response to the first physical address range being non-contiguous with the second physical address range, performing a single cache walk for the first physical address range; and setting the current region to the second physical address range.

5. The method of claim 1, further comprising:
tracking whether each of a plurality of virtual memory allocations maps to a contiguous physical address range;
in response to the first cache flush request, translating the first virtual address range to a physical address range in response to the first virtual address range mapping to a contiguous physical address range; and
triggering a cache flush based on the contiguous physical address range.

6. The method of claim 1, further comprising:
sending a pair of translation requests for a beginning virtual address and an ending virtual address of the first virtual address range;
receiving, in response to the pair of translation requests, a beginning physical address and an ending physical address corresponding to the first virtual address range; and
sending a single cache flush request to flush a physical address range between the beginning physical address and the ending physical address in response to a size of the first virtual address range equaling a size of the physical address range.

7. The method of claim 6, further comprising:
sending a set of translation requests for virtual addresses within the first virtual address range while flushing the physical address range; and
verifying that the physical address range is contiguous based on responses to the set of translation requests.

8. A device comprising: a physical memory; a cache; and a cache flush controller to: in response to receiving a first cache flush request to perform a cache flush of a first virtual address range within a virtual memory mapping to the physical memory, seta current region to a first physical address range of the physical memory that is mapped to the first virtual address range; in response to receiving a second cache flush request to perform a cache flush of a second virtual address range within the virtual memory, set the current region to the first physical address range plus a second physical address range mapped to the second virtual address range in response to the first physical address range being contiguous with the second physical address range; and perform a single cache walk to write back to the physical memory or invalidate matching lines stored within a cache to perform a cache flush of the first virtual address range and the second virtual address range to the current region of the physical memory.

9. The device of claim 8, wherein the first virtual address range is contiguous with the second virtual address range.

10. The device of claim 8, wherein the cache flush controller is further configured to:
translate, in response to the first cache flush request, a first beginning virtual address of the first virtual address range into a first beginning physical address of the first physical address range within the physical memory;

translate, in response to a third cache flush request to perform a cache flush of a third virtual address range within the virtual memory, a third beginning virtual address of the third virtual address range into a third beginning physical address of a third physical address range; and set the current region to the first physical address range plus the second physical address range plus the third physical address range in response to the third physical address range being contiguous with the current region.

11. The device of claim 8, wherein the cache flush controller is further configured to:

perform a single cache walk for the first physical address range if the first physical address range is non-contiguous with the second physical address range; and set the current region to the second physical address range.

12. The device of claim 8, wherein the cache flush controller is further configured to:

track whether each of a plurality of virtual memory allocations maps to a contiguous physical address range;

in response to the first cache flush request, translate the first virtual address range to a physical address range in response to the first virtual address range mapping to a contiguous physical address range; and trigger a cache flush based on the contiguous physical address range.

13. The device of claim 8, wherein the cache flush controller is further configured to:

send a pair of translation requests for a beginning virtual address and an ending virtual address of the first virtual address range;

receive, in response to the pair of translation requests, a beginning physical address and an ending physical address corresponding to the first virtual address range; and send a single cache flush request to flush a physical address range between the beginning physical address and the ending physical address in response to a size of the first virtual address range equaling a size of the physical address range.

14. The device of claim 13, wherein the cache flush controller is further configured to:

send a set of translation requests for virtual addresses within the first virtual address range while flushing the physical address range; and verify that the physical address range is contiguous based on responses to the set of translation requests.

15. A non-transitory storage medium accessible by a computer system during use to provide instructions to the computer system to: in response to receiving a first cache flush request to perform a cache flush of a first virtual address range within a virtual memory mapping to a physical memory, set a current region to a first physical address range of the physical memory that is mapped to the first virtual address range; in response to receiving a second cache flush request to perform a cache flush of a second virtual address range within the virtual memory, set the current region to the first physical address range plus a second physical address range mapped to the second virtual address range in response to the first physical address range being contiguous with the second physical address range; and perform a single cache walk to write back to the physical memory or invalidate matching lines stored within a cache to perform a cache flush of the first virtual address range and the second virtual address range to the current region of the physical memory.

16. The non-transitory storage medium of claim 15, wherein the first virtual address range is contiguous with the second virtual address range.

17. The non-transitory storage medium of claim 15, wherein the instructions are further to:

translate, in response to the first cache flush request, a first beginning virtual address of the first virtual address range into a first beginning physical address of the first physical address range within the physical memory;

translate, in response to a third cache flush request to perform a cache flush of a third virtual address range within the virtual memory, a third beginning virtual address of the third virtual address range into a third beginning physical address of a third physical address range; and set the current region to the first physical address range plus the second physical address range plus the third physical address range in response to the first physical address range being contiguous with the current region.

18. The non-transitory storage medium of claim 15, wherein the instructions are further to:

track whether each of a plurality of virtual memory allocations maps to a contiguous physical address range;

in response to the first cache flush request, translate the first virtual address range to a physical address range in response to the first virtual address range mapping to a contiguous physical address range; and trigger a cache flush based on the contiguous physical address range.

19. The non-transitory storage medium of claim 15, wherein the instructions are further to:

send a pair of translation requests for a beginning virtual address and an ending virtual address of the first virtual address range;

receive, in response to the pair of translation requests, a beginning physical address and an ending physical address corresponding to the first virtual address range; and send a single cache flush request to flush a physical address range between the beginning physical address and the ending physical address in response to a size of the first virtual address range equaling a size of the physical address range.

20. The non-transitory storage medium of claim 19, wherein the instructions are further to:

send a set of translation requests for virtual addresses within the first virtual address range while flushing the physical address range; and verify that the physical address range is contiguous based on responses to the set of translation requests.

* * * * *